United States Patent [19]

Heller et al.

[11] Patent Number: 4,547,949

[45] Date of Patent: Oct. 22, 1985

[54] METHOD FOR MOUNTING A RADAR REFLECTOR ON AN ARTILLERY SHELL

[75] Inventors: Rudolf Heller, Zurich; Iwan Khan, Wallisellen, both of Switzerland

[73] Assignee: Contraves AG, Zurich, Switzerland

[21] Appl. No.: 582,754

[22] Filed: Feb. 23, 1984

Related U.S. Application Data

[63] Continuation of Ser. No. 319,707, Nov. 9, 1981, Pat. No. 4,446,792.

[30] Foreign Application Priority Data

Dec. 2, 1980 [CH] Switzerland ........................ 8891/80

[51] Int. Cl.[4] ........................................ B23P 17/00

[52] U.S. Cl. ........................................ 29/421 E

[58] Field of Search ............... 102/473, 214, 501, 514, 102/517, 516; 29/421 E

[56] References Cited

U.S. PATENT DOCUMENTS

| | | | |
|---|---|---|---|
| Re. 26,685 | 10/1969 | Broske | 29/421 E |
| 2,343,344 | 3/1944 | Thompson . | |
| 2,367,206 | 1/1945 | Davis | 29/421 E |
| 3,062,142 | 11/1962 | Breza et al. | 29/421 E |
| 3,076,408 | 2/1963 | Poulter et al. | 29/421 E |
| 3,230,531 | 11/1961 | Bischoff et al. . | |
| 3,478,212 | 1/1967 | Turck . | |
| 3,543,387 | 12/1970 | Golinelli et al. . | |
| 3,654,553 | 4/1972 | Mary et al. . | |
| 3,681,690 | 8/1972 | Mary . | |
| 3,757,632 | 9/1973 | Bellinger . | |
| 3,798,653 | 3/1974 | Jones, Jr. . | |
| 3,814,019 | 6/1974 | Hines, Jr. . | |
| 3,872,707 | 3/1975 | Broske | 29/421 E |
| 3,914,767 | 10/1975 | Jones, Jr. . | |
| 4,257,719 | 3/1981 | Hunt et al. | 29/421 E |

FOREIGN PATENT DOCUMENTS

| | | | |
|---|---|---|---|
| 540828 | 3/1957 | Belgium . | |
| 49738 | 7/1981 | European Pat. Off. | 102/517 |
| 1578209 | 12/1966 | Fed. Rep. of Germany . | |
| 2344820 | 9/1973 | Fed. Rep. of Germany . | |
| 2634518 | 7/1976 | Fed. Rep. of Germany . | |
| 7934250 | 4/1980 | Fed. Rep. of Germany . | |
| 1348590 | 12/1963 | France . | |
| 2191718 | 1/1974 | France . | |
| 2444253 | 12/1979 | France . | |
| 147838 | 9/1931 | Switzerland . | |
| 2011042 | 7/1979 | United Kingdom . | |

OTHER PUBLICATIONS

J. D. Walton, "Radome Engineering Handbook", 1970, Marcel Dekker Inc., New York, pp. 209-213.

"International Conference on Antennas and Propagation", Part 1: Antennas, Nov. 28-30, 1978, The Institution of Electrical Engineers, Savoy Place, London, (GB), A. R. Sindoris et al., The Spiral Slot-A Unique Microstrip Antenna, pp. 150-154.

*Primary Examiner*—Howard N. Goldberg
*Assistant Examiner*—Steven Nichols
*Attorney, Agent, or Firm*—Werner W. Kleeman

[57] ABSTRACT

The method of mounting a radar reflector on an artillery shell contemplates providing a body constituted by a functional element and a sleeve element formed rotationally-symmetrical about a lengthwise axis of said body with at least one explosive device arranged at least at the neighborhood of an outer surface of said sleeve element near to one end of said sleeve element and remote from the functional element. The body is mounted on the artillery shell and the explosive device is detonated in order to establish a form-locking connection of the sleeve element with the shell. The detonation of the explosive device severs the sleeve element at the region of said one end of said sleeve element in order to provide a substantially straight-lined closure of the sleeve element about the artillery shell in order to avoid undesirably altering ballistic characteristics of the artillery shell.

3 Claims, 6 Drawing Figures

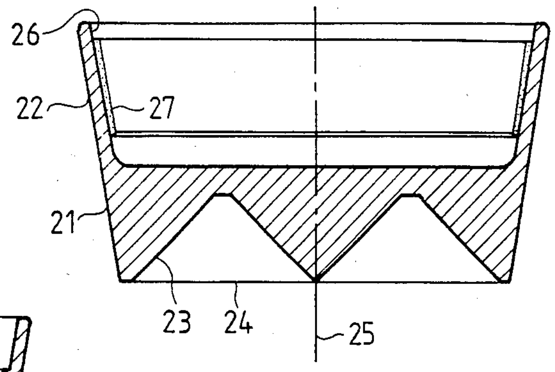
FIG. 2
FIG. 3
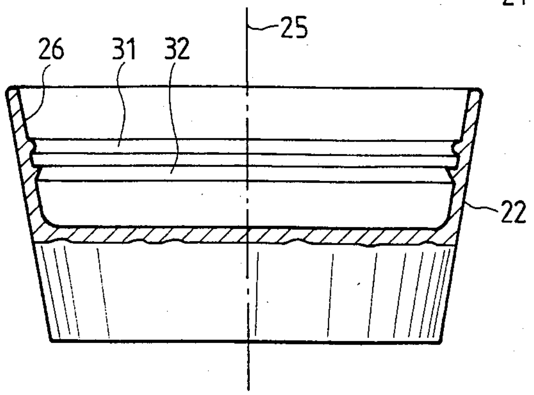
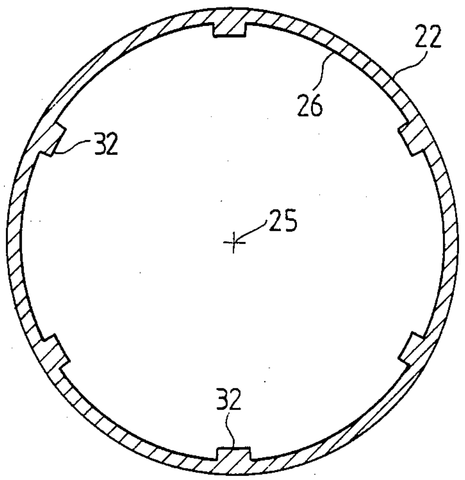
FIG. 4
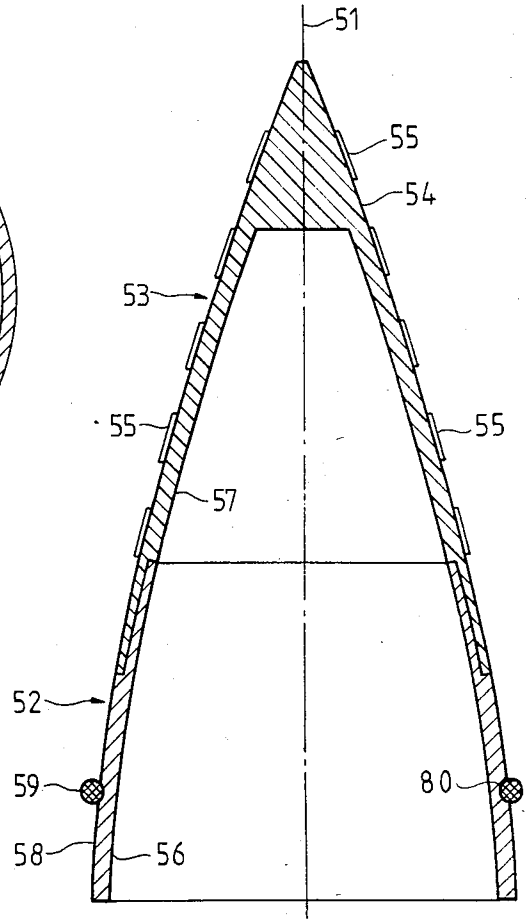
FIG. 5

METHOD FOR MOUNTING A RADAR REFLECTOR ON AN ARTILLERY SHELL

CROSS REFERENCE TO RELATED APPLICATION

This application is a continuation application of my commonly assigned copending U.S. application Ser. No. 06/319,707, filed Nov. 9, 1981, now U.S. Pat. No. 4,446,792, granted May 8, 1984.

BACKGROUND OF THE INVENTION

The present invention relates to a new and improved construction of a body which can be axially mounted or incorporated at an artillery shell or projectile and comprises a functional or operational element which is constructed as a radar reflector. The present invention also relates to an improved method of mounting such body including the radar reflector onto the artillery shell.

A body of this type is known, for instance, from German Petty Patent No. 7,934,250, granted Apr. 30, 1980 and the cognate French Patent No. 2,444,253, published July 8, 1980. In these patents there is described a radar reflector which can be mounted as an additional component at the floor or base of an ordnance projectile or shell and connected thereto by means of threaded screws or bolts. While this type of connection is certainly safe and simple, it nonetheless requires drilling holes and cutting threads in the base of the shell, and thus, necessitates specific preparatory work which must be carried out in a workshop or the like.

SUMMARY OF THE INVENTION

Therefor, it is a primary object of the present invention to provide a new and improved method of attaching a radar-reflecting body to an artillery shell which is not afflicted with the aforementioned drawbacks and shortcomings of the prior art and is constructed such that it can be incorporated At and connected to an unaltered standard artillery shell.

Another important object of the present invention is to provide a new and improved method of attaching or mounting a radar-reflecting body on an artillery shell wherein the internal and external ballistic characteristics of the shell being retrofitted with the inventive radar-reflecting body only minimally deviate from the characteristics of a standard shell.

It is a further important object of the present invention to provide a new and improved method of attaching a radar-reflecting body to an artillery shell such that it can be retrofitted manually and easily and at relatively low cost at an ordnance shell or projectile.

Now in order to implement these objects and others which will become more readily apparent as the description proceeds, the radar-reflecting body according to the present invention comprises a sleeve element which is turnably or pivotably symmetrical about a lengthwise axis and can be attached to the shell.

In the context of this disclosure the term "rotational symmetry" or equivalent terms relate to a body of revolution which is symmetrical in all positions of rotation with respect to an axis of symmetry. On the other hand, the expression "pivotably or turnably symmetrical" or equivalent terminology is intended to mean a body having symmetry which only can be established by turning or pivoting such body through a predetermined angle. In other words, the body can be rotated from one position, through a predetermined angle, into a given new position where it appears not to have moved from its original position, i.e. the symmetry is again established. For instance, a square or polygonal body possesses turning or pivotal symmetry, whereas a circle or cylinder possesses rotational symmetry.

As previously indicated, the invention is also concerned with a novel method of mounting a radar reflector on an artillery shell or the like wherein there are accomplished the steps of:

providing a body constituted by a functional element constructed as a radar reflector, for instance of the triple-mirror type containing triple mirrors and a sleeve element formed rotationally-symmetrical about a lengthwise axis of said body;

providing for said body at least one explosive device arranged at least at the neighborhood of an outer surface of said sleeve element near to one end of said sleeve element and remote from said functional element;

mounting said body on the artillery shell;

detonating said explosive device in order to establish a form-locking connection of said sleeve element with the shell; and severing said sleeve element at the region of said one end of said sleeve element in order to provide a substantially straight-lined closure of the sleeve element about the artillery shell in order to avoid undesirably altering ballistic characteristics of the artillery shell.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIGS. 2 to 6 each disclose a respective modified embodiment of sleeve element used in the radar-reflecting body.

DETAILED DESCRIPTION OF THE PREFERRED EMBODIMENTS

Figure 1:
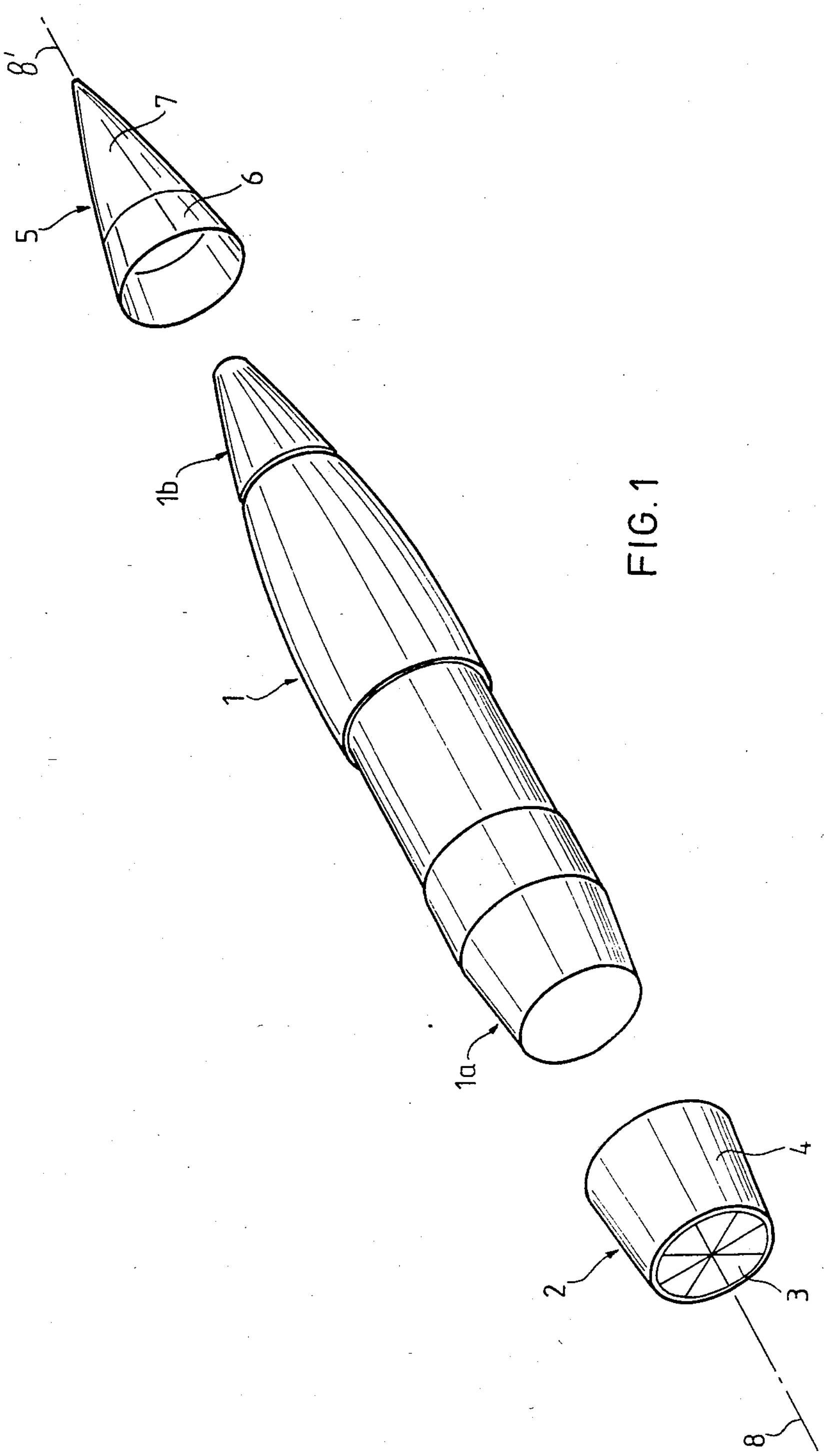
FIG. 1 is an exploded view of an ordnance projectile or shell and two radar-reflecting bodies, one of which is intended to be attached to the front end and one to the rear end of the shell or projectile.

Describing now the drawings, FIG. 1 illustrates a conventional type of artillery shell or projectile which is generally designated by reference numeral 1. A first radar-reflecting body 2 is provided with a base or floor 3 which is constructed as a multiple triple-mirror reflector defining a functional or operational element, and may be of the type disclosed for instance, in the aforementioned German Petty Pat. No. 7,934,250. Formed at the floor or base 3 is a sleeve element 4 which is intended to be fitted onto the pin or plug-like portion 1*a* of the projectile or shell 1, i.e. to the tail thereof. A second radar-reflecting body 5 is provided with a sleeve element 6 which is intended to be fitted onto the ogive tip 1*b*, i.e. the nose of the ordnance shell 1 or the like. The front part or section 7 of this body 5 is constructed as a radar-reflecting body, defining a functional element and may be, for instance, in the form of a Fresnel lens or a Van-Atta reflector. The two bodies 2 and 5 are each constructed to be turnably or pivotably symmetrical about a lengthwise axis 8, 8', which coincides with the lengthwise axis of the shell 1 when the bodies 2 and 5 are attached thereto.

In FIG. 1 the two bodies 2 and 5 are also illustrated as being rotationally symmetrical about the lengthwise axis 8, 8'. However, there will be hereinafter described variant embodiments of radar-reflecting bodies, which are turnably or pivotably symmetrical, but not rotationally symmetrical. Body 2, which is constructed as a multiple triple-mirror reflector, is formed of metal, such as brass or an aluminum alloy as disclosed in the aforementioned German Petty Pat. No. 7,934,250. Body 5, which is constructed as a Fresnel lens or Van-Atta reflector, is composed, for instance, of two pieces or elements 6 and 7. Element 6 is a sleeve element which is formed of brass or an aluminum alloy. The front element 7 is formed of a plastic material, such as an epoxy resin or polyurethane resin, and covered by a metallic coating pattern which consists of copper or aluminum and serves for forming a conventional Fresnel lens or a Van-Atta reflector.

FIG. 2 is a sectional view of a variant construction of radar-reflecting body which is intended to be attached to a pin or plug of a projectile or shell. Such radar-reflecting body is formed of metal and constructed as one piece or integrally. However, there can be distinguished a base or floor element 21 and a sleeve element 22 constituting the mentioned body. The base or floor element 21 forms the radar-reflecting functional element. For this purpose, the base or floor element 21 is constructed as a multiple triple-mirror reflector of the type described, for instance in the aforementioned German Petty Pat. No. 7,934,250 and indicated in the drawing of FIG. 2 by the boundary lines 23 and 24 of the sectional view. The entire body 21, 22 is constructed such as to be turnably symmetrical about an axis 25, while the sleeve element 22 is constructed such as to be rotationally symmetrical about this axis 25, and specifically, so that it can be exactly attached or retrofitted onto the pin or plug of the projectile or shell. For retrofitting or attaching the radar-reflecting body onto the plug or pin of the projectile or shell, there is provided at the inner surface of the sleeve element 22 an adhesive layer or coating 27 which, for enhancing the clarity of the drawing, is shown herein thicker than it actually is. This adhesive or attachment layer 27 consists, for instance, of a layer of plastic material, such as an epoxy resin or polyurethane resin, to which there has been added a suitable grinding agent or material, for instance powdery or pulverulent corundum, for increasing the static friction between the inner surface of the sleeve element 22 and the outer surface of the projectile or shell or the pin or plug thereof, as the case may be.

FIG. 3 shows another variant of radar-reflecting body, wherein the inner surface of the sleeve element 22 is provided with beads or fins 31 or claws 32 or equivalent structure. These beads or fins 31 or claws 32 or the like serve for fixedly attaching the sleeve element 22 to the pin or plug of the projectile or shell as soon as the sleeve element 22 is pressed onto the latter. Both the beads 31 and the claws 32 can be arranged in a rotationally symmetrical manner about the axis 25 at the inner surface 26 of the sleeve element 22. However, they equally can be constructed as projections or extensions which are arranged in a turnably or pivotably symmetrical manner at the inner surface 26. Such projections or extensions can be constructed, for instance, as six claws 32, each offset from one another by 60° about the axis 25 and having a peripheral length of about 5°. Such an arrangement can be seen from FIG. 4 which is a sectional view of the sleeve element 22 at the elevational level of the claws 32 or equivalent protuberances or the like.

FIG. 5 illustrates in sectional view a further variant of radar-reflecting body which is intended to be attached to the ogive tip of a projectile or shell, like that shown for instance in FIG. 1. The entire radar-reflecting body is constructed such as to be rotationally symmetrical about the axis 51. The sleeve element 52 is formed of metal and adhesively bonded to a radar-reflecting functional element 53 which is formed of a suitable plastic material. Arranged at the outer surface 54 of the functional or operational element 53 are electrically conductive strips 55 which cooperatively form a Fresnel lens. The internal part or section 56 of the sleeve element 52 is formed such that it precisely fits onto the ogive tip of the projectile or shell. The internal part or section 57 of the functional element 53 is provided with an appropriate recess for receiving a head fuze of the projectile or shell. At the outer surface 58 of the sleeve element 52 there is positioned in a bead or depression 80 arranged in an essentially rotationally symmetrical manner about the axis 51 a fuse cord 59. After attaching or retrofitting the sleeve element 52 onto the projectile or shell 1 in a substantially conventional manner by pressing or possibly by blast welding or electronic discharge welding, the detonation of the fuse cord 59 establishes a form-locking or positive connection of the sleeve element 52 with the ogive tip 1*b* of the projectile or shell 1. The beads 31 and claws 32, which are illustrated in FIGS. 3 and 4, equally can be constructed such that they can be welded together with the pin or plug 1*a* of the projectile or shell 1 by electron is discharge welding.

Figure 6:
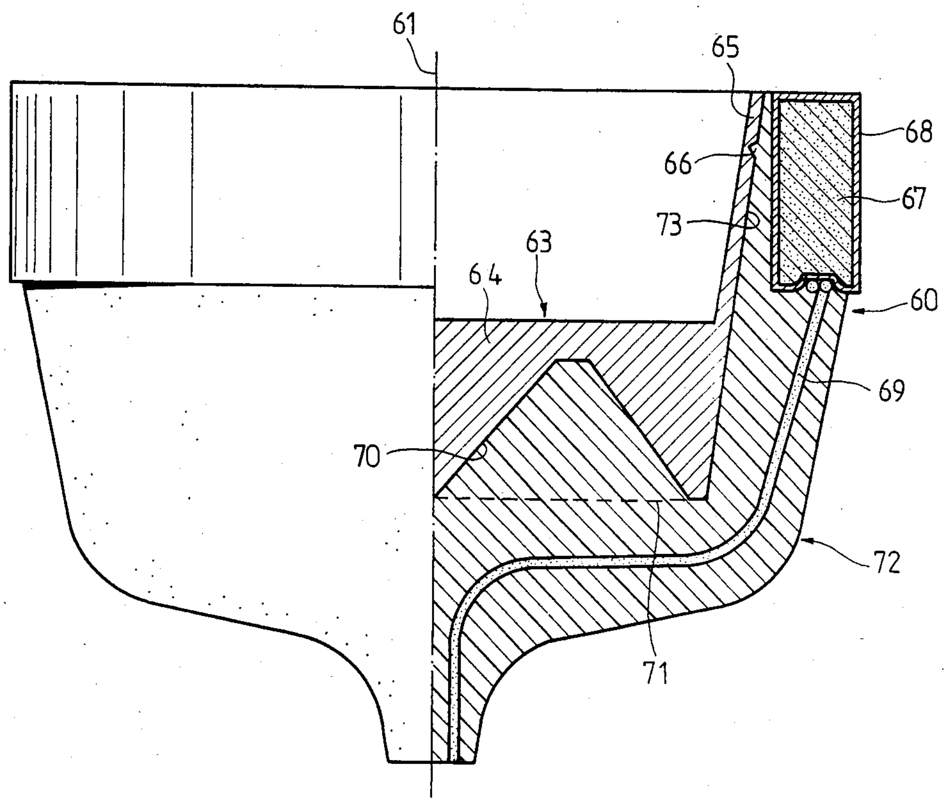

FIG. 6 is a semi-sectional view of a radar-reflecting body 63 which is intended to be attached or retrofitted onto the pin or plug 1*a* of a projectile or shell 1, and further shows an explosive device 60 which is arranged at the radar-reflecting body 63. By means of the explosive device 60 the radar-reflecting body 63 is fixedly attached to the projectile or shell 1 by means of a method known as blast or explosive welding. Body 63 is formed as one piece of metal, wherein its base or floor element 64 is constructed, for instance, as a multiple triple-mirror reflector, which has been indicated in the drawing of FIG. 6 by means of the boundary lines 70 and 71 of the sectional view. A sleeve element 65 of the radar-reflecting body 63 is provided at its outer surface 73 with a substantially annular or ring-shaped groove or notch 66.

The explosive device 60 is formed of a housing 68 which is rotationally symmetrical with respect to the axis 61 and is filled with an explosive charge 67. The detonation of the explosive charge 67 is performed by means of a plurality of fuse cords 69 which are imbedded in a body 72 formed of a rigid plastic foam. By virtue of the explosive effect the sleeve element 65 is cut through or severed at the location of the groove or notch 66. This results in a substantially straight-lined or linear closure of the sleeve element 65. Prior to the explosive or blast welding of the radar-reflecting body 63 onto the projectile or shell 1, the tail thereof is cleaned with solvent, degreased and rubbed by means of an emery cloth or the like. Thereafter, the body 63 equipped with the explosive device 60 is placed upon the tail of the projectile or shell and, preferably from a distance, the explosive charge is detonated.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. A method of mounting a radar reflector on an artillery shell, comprising the steps of:

providing a one-piece turnably-symmetrical body having a lengthwise axis and capable of being fitted onto the artillery shell and constituted by a functional element constructed as a radar reflector of the triple-mirror type containing triple mirrors and a sleeve element formed rotationally-symmetrical about said lengthwise axis of said body;

providing for said body at least one explosive device arranged at least at the neighborhood of an outer surface of said sleeve element near to one end of said sleeve element and remote from said functional element containing said triple mirrors;

mounting said body on the artillery shell;

detonating said explosive device in order to establish a form-locking connection of said sleeve element with the shell; and severing said sleeve element at the region of said one end of said sleeve element by virtue of the detonation of the explosive charge, in order to provide a substantially straight-lined closure of the sleeve element about the artillery shell in order to avoid undesirably altering ballistic characteristics of the artillery shell.

2. The method as defined in claim 1, further including the step of:

structuring said explosive device such that said explosive device is essentially rotationally-symmetrical about the lengthwise axis of the body.

3. The method as defined in claim 1, further including the steps of:

cleaning a tail portion of the artillery shell prior to mounting said body thereat; and following such cleaning step mounting said body at the tail portion of the artillery shell.

* * * * *

UNITED STATES PATENT AND TRADEMARK OFFICE
CERTIFICATE OF CORRECTION

PATENT NO. : 4,547,949

DATED : October 22, 1985

INVENTOR(S) : RUDOLF HELLER and IWAN KAHN

It is certified that error appears in the above—identified patent and that said Letters Patent is hereby corrected as shown below:

Please correct the second inventor's name by deleting "Khan" and inserting --Kahn--

Column 1, line 40, please delete "At" and insert --at--

Column 4, line 33, please delete "electron is" and insert --electronic--

Signed and Sealed this

*Eleventh* Day of *February 1986*

[SEAL]

*Attest:*

DONALD J. QUIGG

*Attesting Officer* *Commissioner of Patents and Trademarks*